No. 734,486. PATENTED JULY 21. 1903.
T. P. WILSON.
WATER STILL.
APPLICATION FILED MAY 1, 1903.
NO MODEL. 3 SHEETS—SHEET 1.

No. 734,486. PATENTED JULY 21, 1903.
T. P. WILSON.
WATER STILL.
APPLICATION FILED MAY 1, 1903.

NO MODEL. 3 SHEETS—SHEET 2.

No. 734,486. PATENTED JULY 21, 1903.
T. P. WILSON.
WATER STILL.
APPLICATION FILED MAY 1, 1903.
NO MODEL. 3 SHEETS—SHEET 3.
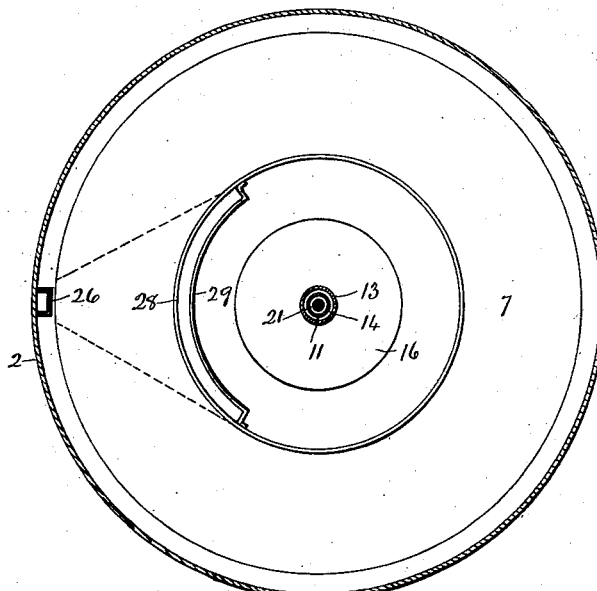
Fig. 3
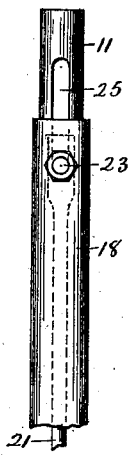
Fig. 6
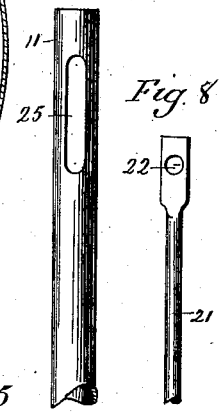
Fig. 7
Fig. 8
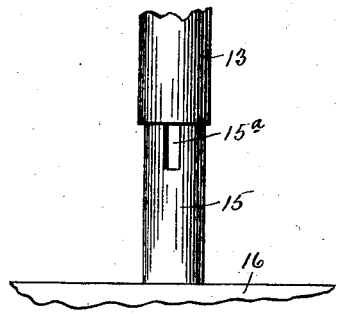
Fig. 4
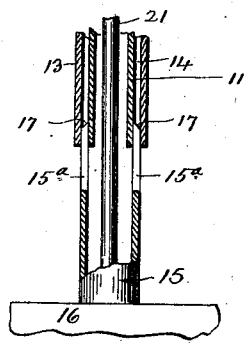
Fig. 5
Witnesses
Thatcher P. Wilson
Inventor
By atty No. 734,486. Patented July 21, 1903.

UNITED STATES PATENT OFFICE.

THATCHER P. WILSON, OF EASTHAVEN, CONNECTICUT, ASSIGNOR OF TWO-THIRDS TO JACOB P. GOODHART, OF NEW HAVEN, CONNECTICUT.

WATER-STILL.

SPECIFICATION forming part of Letters Patent No. 734,486, dated July 21, 1903.

Application filed May 1, 1903. Serial No. 155,095. (No model.)

*To all whom it may concern:*

Be it known that I, THATCHER P. WILSON, of Easthaven, in the county of New Haven and State of Connecticut, have invented a new and useful Improvement in Water-Stills; and I do hereby declare the following, when taken in connection with the accompanying drawings and the figures of reference marked thereon, to be a full, clear, and exact description of the same, and which said drawings constitute part of this specification, and represent, in—

Figure 1:
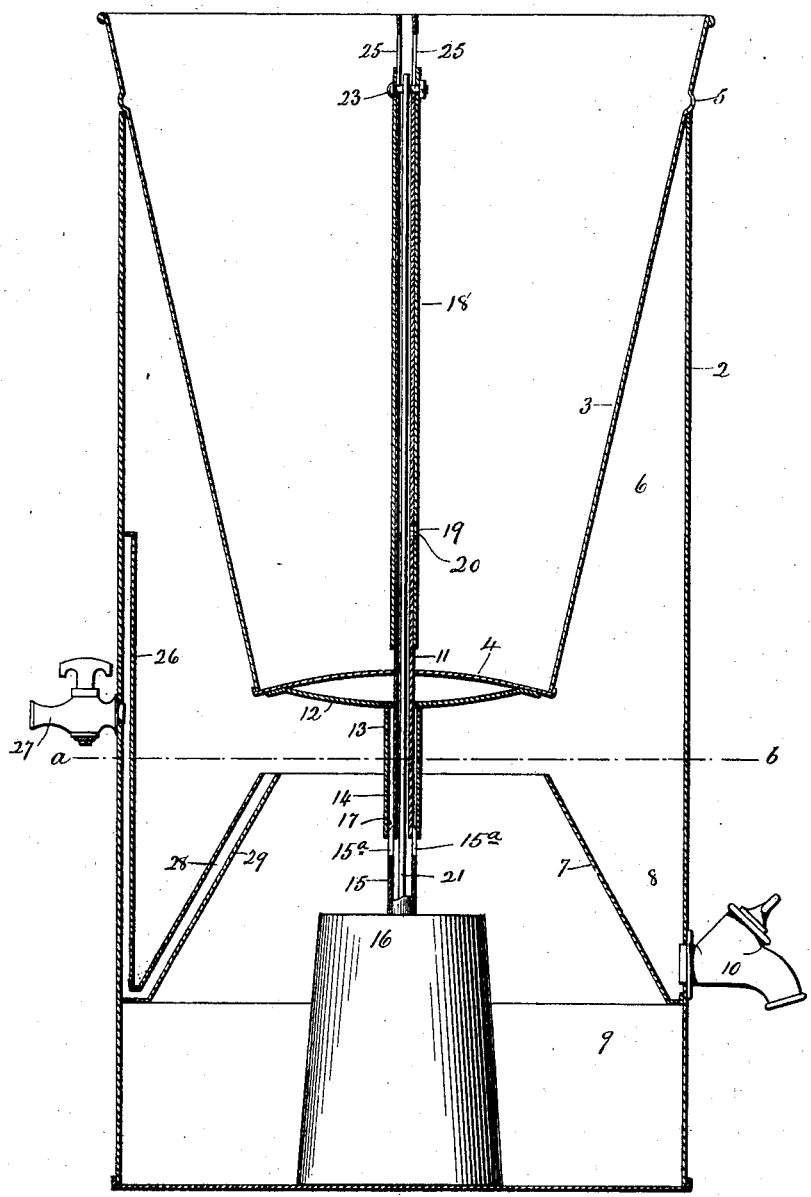
Figure 2:
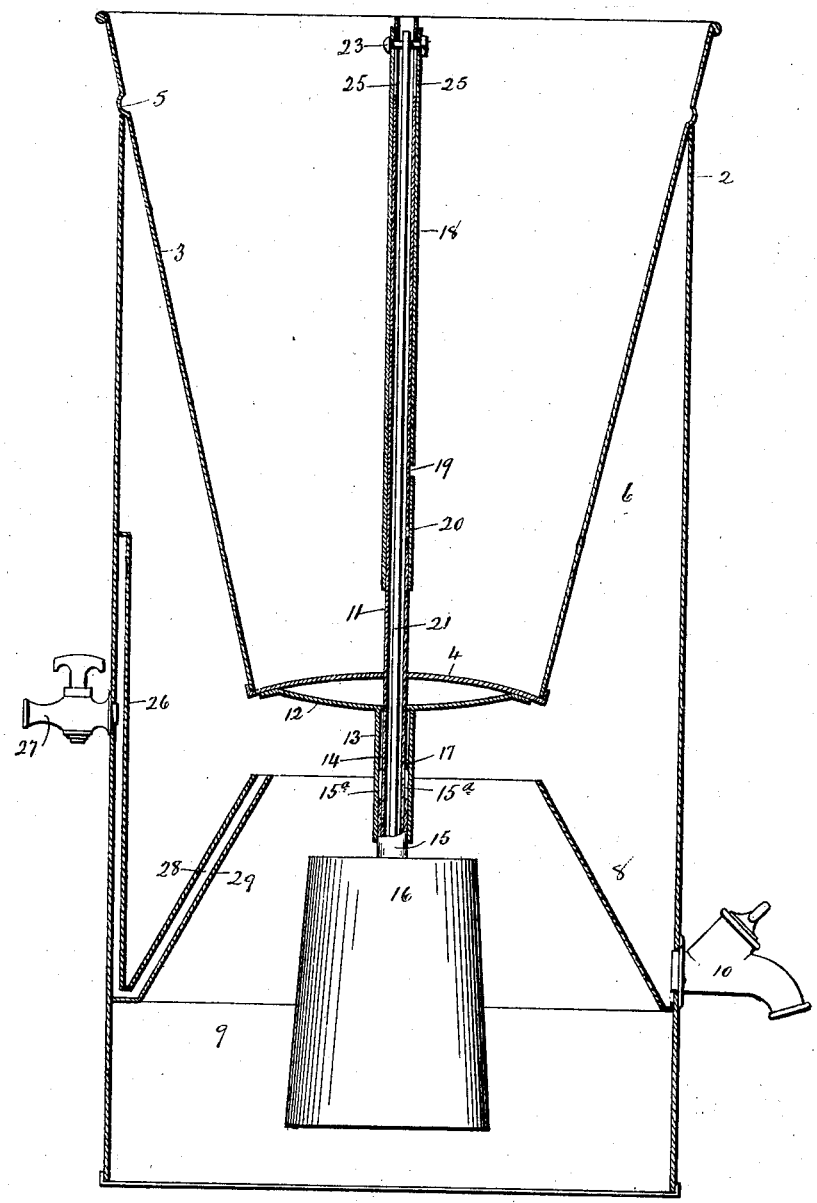

Figure 1, a view in vertical section of one form which my improved portable water-still may assume, the float being shown in its lowest position and the valve open; Fig. 2, a corresponding view with the float in its highest position and the valve closed; Fig. 3, a view in horizontal section on the line $a\ b$ of Fig. 1;
Fig. 4, a broken view, in side elevation, showing the upper end of the float, the tubular valve, and the lower end of the tubular valve-seat; Fig. 5, a broken view of the same parts in vertical section; Fig. 6, a broken view, in side elevation, of the upper ends of the feed-tube and the cut-off tube and showing the coupling-rod by broken lines; Fig. 7, a detached broken view, in side elevation, of the upper end of the feed-tube; Fig. 8, a corresponding view of the coupling-rod.

My invention relates to an improvement in portable water-stills, the object being to produce a simple, compact, effective, and convenient automatic apparatus constructed with particular reference to being easily cleaned and to being used on the top of an ordinary kitchen stove or range.

With these ends in view my invention consists in a portable water-still having certain details of construction and combinations of parts, as will be hereinafter described, and pointed out in the claims.

In carrying out my invention as herein shown I employ an upright cylindrical tank 2, having a flat bottom and open at the top. Into the open upper end of this tank I set a tapering independently-formed cold-water reservoir 3, having a concaved bottom 4 and formed near its upper end with a circumferential outwardly-projecting bead 5, by which it is supported in the upper end of the tank, above which its upper end projects. The main portion of the reservoir 3 is made enough smaller in diameter than the diameter of the tank to form an annular condensing-chamber 6. Near the lower end of the tank I locate a shell 7 in the form of a truncated cone, the lower edge of which is soldered or otherwise secured directly to the inner wall of the tank. This shell so located produces an annular distilled-water chamber 8, V-shaped in cross-section, and a retort 9, which occupies the bottom portion of the tank. A cock 10 is set into the tank just above the bottom of the distilled-water chamber 8 for drawing off the distilled water. In the center of the bottom 4 of the reservoir 3 I mount a long vertically-arranged feed-tube 11, rising at its upper end to the top of the reservoir and projecting at its lower end through the bottom thereof. A bridge 12, secured to the bottom of the reservoir 3, reinforces the said tube. A tubular valve-seat 13, larger in diameter than the feed-tube 11 and arranged concentric therewith, is secured at its upper end to the lower face of the said bridge 12 and extends downwardly to the lower end of the feed-tube, there being an annular valve-space 14 between them. A tubular valve 15, centrally mounted upon the upper end of a float 16, is adapted in diameter and thickness to enter the said space, in which it fits so closely as to form a water-tight joint. It is formed at its upper end at opposite points with two vertically-arranged slot-like discharge-openings 15ª, which, according to the position of the float, are exposed below the lower end of the tubular valve-seat 13 or located entirely within the same. The upper edge of the said valve 15 is formed with a bevel 17 to adapt it to more readily enter the annular valve-space 14, already referred to. The upper portion of the feed-tube 11 is inclosed nearly throughout its length by a vertically movable or sliding cut-off tube 18, formed with a feed-port 19, arranged so that when the valve 15 is open, as shown in Fig.

1, it will register with a corresponding feed-port 20, formed in the feed-tube 11 near the bottom of the reservoir 3.

In order that the cut-off tube 18 may rise and fall with the float, I provide the same with a long coupling-rod 21, rising from the center of the tubular valve 15 and extending upward through and nearly to the upper end of the feed-tube 11 and there flattened and formed with a transverse hole 22, receiving a coupling-screw 23, passing through transverse holes formed in the upper end of the cut-off tube and also passing through two oppositely-arranged long vertical slots 25, formed in the upper end of the feed-tube. Under this construction the cut-off tube rises and falls with the float 16, which is thus permanently connected with the reservoir 3, so that the same and the float may be removed and inserted into the tank 2 virtually as one piece.

To provide for the aeration of the distilled water, I locate within the tank 2 a vertical air-supply pipe 26, to which air is admitted through a cock 27 and which at its lower end opens into a segmental air-chamber 28, formed by locating a segmental plate 29 within the shell 7, to which its lower end and its sides are secured, the said chamber being open at the top. Under this construction air entering through the pipe 26 is "discharged," so to speak, in a broad flat current or sheet into that portion of the condensing-chamber 6 located directly below the bottom of the reservoir 3. The upward draft of the steam rising from the retort into the condensing-chamber creates a suction which operates to draw in sufficient outside air to thoroughly aerate the distilled water. When in the operation of my improved portable water-still the float 16 descends sufficiently in the retort 9 to expose the lower ends of the discharge-openings 15ª of the tubular valve 15 below the lower end of a tubular valve-seat 13, water will be fed from the reservoir 3 into the retort, for at this time the feed-ports 19 and 20 are in partial or full registration, owing to the corresponding downward movement of the cut-off tube with the float. As the water rises in the retort the float will be lifted and the flow of water gradually cut off. Then when the lower ends of the openings 15ª are lifted entirely above the lower edge of the valve-seat 13 the water will be entirely cut off, not only at the valve, but also at the feed-ports 19 and 20, which will by this time be entirely out of registration, for the reason that the cut-off tube 18 moves up and down simultaneously with and to the same extent as the float with which it is coupled, as described. The action of the apparatus so far as the feeding of water into the retort is concerned is thus made automatic.

I would have it understood that I do not limit myself to the exact construction shown and described, but hold myself at liberty to make such departures therefrom as fairly fall within the spirit and scope of my invention.

Having fully described my invention, what I claim as new, and desire to secure by Letters Patent, is—

1. In a portable water-still, the combination with a tank containing a retort and a distilled-water chamber, of an independently-formed water-reservoir adapted to be set into the upper end of the said tank, a vertically-arranged feed-tube mounted in the bottom of the reservoir and projecting downwardly therefrom, a float, a valve located at the lower end of the said tube and controlled for feeding and cutting off the water by the action of the said float, a cut-off located within the reservoir and coacting with the upper portion of the feed-tube for admitting water thereto and excluding it therefrom, and means connecting the said cut-off with the float whereby the valve and cut-off act together.

2. In a portable water-still, the combination with a tank containing a retort and a distilled-water chamber, of an independently-formed water-reservoir adapted to be set into the upper end of the said tank, a vertically-arranged feed-tube mounted in the bottom of the reservoir and projecting downwardly therefrom, a tubular valve-seat inclosing the projecting lower end of the feed-tube and larger in diameter than the same so as to form a valve-space between them, a float, a tubular valve carried thereby and adapted to enter the said valve-space and formed with discharge-openings, a cut-off tube inclosing the upper portion of the feed-tube and formed with a feed-port registering with a feed-port formed therein, and a coupling-rod secured to the float and extending upwardly into the feed-tube and connected with the cut-off tube, whereby the same is caused to rise and fall with the float.

3. In a portable water-still, the combination with a tank containing a retort and a distilled-water chamber, of an independently-formed water-reservoir adapted to be set into the upper end of the said tank, a float, a vertically-arranged feed-tube mounted in the bottom of the reservoir, a valve automatically operated by the float and located at the lower end of the said tube, and a cut-off located within the reservoir and connected with the float so as to operate simultaneously therewith.

4. In a portable water-still, the combination with a tank, of a shell located in the lower end thereof and having the form of a truncated cone and producing a distilled-water chamber and a retort, an independently-formed water-reservoir adapted to be set into the upper end of the said tank, a float located in the retort, an automatic valve operated by the said float for feeding water automatically from the reservoir into the retort, a segmental plate located on the inside of the said shell and forming a segmental chamber closed at its lower end and sides and open at the top, and air connection into the lower end of the said chamber which supplies air to the apparatus, the upward draft of steam in which draws the air thereinto.

In testimony whereof I have signed this specification in the presence of two subscribing witnesses.

THATCHER P. WILSON.

Witnesses:
FREDERIC C. EARLE,
J. H. SHUMWAY.